(12) United States Patent
Wunder et al.

(10) Patent No.: US 6,232,019 B1
(45) Date of Patent: May 15, 2001

(54) GEL ELECTROLYTES FOR ELECTROCHROMIC AND ELECTROCHEMICAL DEVICES

(75) Inventors: Stephanie L. Wunder, Chadds Ford; Hong Peng Wang; Yury K. Yarovoy, both of Philadelphia, all of PA (US)

(73) Assignees: Lithium Technology Corporation, Plymouth Meeting; Temple University-of the Commonwealth System of Higher Education, Philadelphia, both of PA (US)

( * ) Notice: Subject to any disclaimer, the term of this patent is extended or adjusted under 35 U.S.C. 154(b) by 0 days.

(21) Appl. No.: 09/184,257

(22) Filed: Nov. 2, 1998

(51) Int. Cl.[7] .................................................. H01M 10/40
(52) U.S. Cl. ............................................ 429/300; 429/303
(58) Field of Search ................................... 429/300, 303; 252/62.2

(56) References Cited

U.S. PATENT DOCUMENTS 5,972,539 * 10/1999 Hasegawa et al. ................... 429/304

* cited by examiner

Primary Examiner—Carol Chaney
Assistant Examiner—M. Wills
(74) Attorney, Agent, or Firm—Seidel, Gonda, Lavorgna & Monaco, PC

(57) ABSTRACT

Gel electrolytes for electrochromic and electrochemical devices wherein in one embodiment polymeric gelling agents/atactic or syndiotactic, and isotactic PMMA, and a lithium salt in a suitable solvent are dissolved at a temperature above the gelation point and cooled to form a gel electrolyte. In another embodiment a preelectrolyte film is formed by casting a solution of a mixture of stereocomplexed PMMA with a plasticizer (a complexing low molecular weight polar solvent) in a non-complexing volatile solvent (e.i., $CClH_3$), followed by the activation of the film in a liquid electrolyte which includes a lithium salt and low molecular weight complexing solvents to form the completed gel electrolyte.

13 Claims, 5 Drawing Sheets

Lithium battery Voltage vs the number of charge/discharge time. Stereocomplexed PMMA gel electrolyte was applied to cathode. Total cycle number = 16.

Discharge capacity vs charge/discharge cycle number. Stereocomplexed PMMA gel electrolyte was applied to cathode.

GEL ELECTROLYTES FOR ELECTROCHROMIC AND ELECTROCHEMICAL DEVICES

BACKGROUND OF THE INVENTION

1. Field of the Invention

This invention relates to ionically conductive polymer gel electrolytes and method of their preparation.

2. Description of the Prior Art

There has been considerable interest in recent years in developing ionically conductive polymer electrolytes that may be used in advanced electrochemical devices, such as fuel cells, lithium secondary batteries, supercapacitors and electrochromic windows. The goal has been to provide electrolytes with fast lithium ion transport at room temperature, combined with high chemical and electrochemical stability and good mechanical properties. Several electrolytes have been devised to meet this goal.

After the first reports of electrolytes based on polyethylene oxide (PEO) and propylene oxide (PPO), many different polymer electrolytes were developed and studied. These include poly(vinylidene fluoride) copolymer, poly(acrylonitrile), polyurethane, polyacrylamide, polytetrahydrofuran, poly(methyl methacrylate), poly(dimethyl siloxane) copolymers, etc. A characteristic feature of these solid polymer electrolytes (SPE) is the formation of a complex between a lithium salt (LiX) and a polymer having an electron donor atom such as O or N. The complex is stabilized by the $X^-$ anion, which usually has a large size. These SPE showed good electrochemical stability and perfect mechanical properties. However, the low values of ionic conductivity obtained at ambient temperatures ($10^{-8}$–$10^{-5}$ S $cm^{-1}$ at room temperature) due to the glassy or semicrystalline state of the polymer structure is the major disadvantage of these electrolytes.

Other approaches have been proposed, such as the use of polymer blends, addition of plasticizers, reduction of the polymer content to very small amounts, or immobilization of liquid electrolyte solutions in polymer matrices. The latter approach appears to be the most promising, and more recently, work has been done on polymer electrolytes that are based on plasticized polymers. Typically these materials include a polymer, an ionic salt and a low molecular-weight organic solvent. A polymer/solvent mass ratio in gel electrolytes is usually less than 1/1 and the ionic conductivity reaches the value of $10^{-3}$ S $cm^{-1}$.

Various procedures were used to immobilize liquid solutions in a polymer matrix, with the final goal of obtaining dimensionally stable membranes while still retaining liquid-like transport properties. These procedures are mainly based on light- or thermally induced crosslinking or gelification. However, the side effects of chemical crosslinking were found to almost completely destroy the quality of the polymer gels. For example, chemical impurities, free radicals, initiators, etc., reacted with and eroded the lithium anode. Further, after chemical crosslinking, the ionic mobility was found to decrease greatly and the ionic conductivity decreased to the order to $10_{-5}$ S/cm. Therefore, polymer gels with physical crosslink points stabilized by crystals or intermolecular entanglements are better candidates for electrolyte separators in lithium batteries, supercapacitors and electrochromic devices.

Physically crosslinked gel electrolytes have been the subject of a number of patent applications and have also been described in various publications.

For example, U.S. Pat. No. 5,219,679 issued to Abraham et al., discloses an electrolyte consisting of polyacrylonitrile, ethylene carbonate, propylene carbonate and lithium perchlorate, having a room temperature conductivity about $10^{-3}$ S $cm^{-1}$. Another reference, U.S. Pat. No. 5,252,413 to Alamgir, et al., describes an electrolyte based on a polymer network comprising polyvinyl chloride, EC, PC and a lithium salt. The conductivity of this electrolyte reaches 1.4 $10^{-3}$ S/cm at ambient temperature. Another patent, U.S. Pat. No. 5,639,574 issued to Hubbard, et al., discloses ionically conductive polymer gels comprising various polymers—poly (vinylidene fluoride), poly(ethylene terephthalate), Nylon 6,6 etc., an organic solvent, and a lithium salt, wherein the polymer is present up to 50% by mass, and ionic conductivity is greater than $1\times10^{-3}$ S $cm^{-1}$.

First systematic studies of PMMA based gel electrolytes, performed by Bohnke, et al., showed that atactic PMMA forms ionically conductive gels in solutions of lithium perchlorate in PC, or mixtures of PC and EC. At the polymer concentrations of about 20% by weight, these gels provided room temperature conductivity in the range of $10^{-3}$ S/cm, and exhibited elasticity at higher frequencies of the dynamic mechanical testing.

Following these studies, there have been reported a number of gel electrolytes, that were based on PMMA. For example, a formulation comprising atactic PMMA, PC, EC and $LiClO_4$ (25:35:35:5) is described by L.Su, et al., as a gel electrolyte for an electrochromic display device [L.Su, J. Fang, Z Xiao and Z.Lu, Thin Solid Films 306,133–136 (1997)].

Another example describes a composition consisting of PMMA, PC, EC and $LiClO_4$ (30:19:46.5:4.5) as a gel electrolyte for a lithium metal-polypyrrole secondary cell [T. Osaka, T. Momma, H. Ito and B. Scrosati, Journ. Power Sources 68,392–396 (1997)].

Yet another reference (Japanese Patent Specification No. 5586070), discloses a battery electrolyte comprising PMMA, PC or γ-butyronitrile, and $LiBF_4$ in the form of a gel possessing elasticity and having conductivity in the range of $10^{-3}$ S $cm^{-1}$.

Other pertinent publications include: L.Su, Z. Xiao, Z. Lu, "All solid-state electrochromic device with PMMA gel electrolyte," Materials Chemistry and Physics 52,180–183 (1998), W. Zhu, S. Zhang, Z. Huang, "Characteristic of ion conductive electrode based on poly(methyl methacrylate), Dianyuan Jishu 21(6), 248–251 (1997), X. Yang, C.Li, G. Chen, "Polymeric gel electrolyte and its application to electrochromic smart window," Yingyong Huaxue, 14(5), 59–62 (1997), Tetsuya Osaka, Toshiyuki Momma, Hidetoshi Ito, Bruno Scrosati, "Performances of lithium/gel electrolyte/polypyrrole secondary batteries," J. Power Sources, 68(2), 392–396 (1997), X. Liu, T. Osaka, "Properties of electric double-layer capacitors with various polymer gel electrolytes," J. Electrochem. Soc., 144 (5), 3066–3071(1997), T. Osaka, T. Momma, H. Ito, B. Scrosati, "Cyclability of lithium/poly(methyl methacrylate)-based gel electrolyte/polypyrrole battery," Proc.—Electrochem. Seoc. 96-17,1–3(1997), X. Liu, T. Osaka, "Properties of electric double-layer capacitors with various polymer gel electrolyte/polypyrrole battery," Proc. -Electrochem.Soc. 96–17, 1–3 (1997), P. E. Stallworth, S. G. Greenbaum, F. Croce, S. Slane and M. Salomon, "Lithium-7 and ionic conductivity studies of gel electrolytes based on poly (methyl methacrylate)," Electrochim. Acta 40 (13–14), 2137–2144 (1995), M. Rezrazi, M. Mullet, O. Bohnke, "Conductivity and viscosity studies of lithium ion conductive electrolytes gelled with poly(methyl methacrylate)," Adv.Mater.Res (Zug.Switz.) 1–2, 495–499 (1994).

The most recent patent reference (U.S. Pat. No. 5,581,394 to Green, et al.) discloses a solid polymer electrolyte for electrochromic devices based on PMMA, PC and $LiClO_4$. In order to solidify the electrolyte it is proposed to partially remove the solvent—PC after preparation of the PMMA/PC/$LiClO_4$ composition, so that the final concentration of the polymer is about 40%. The conductivity of such quasi-solid electrolytes is less than $10^{-4}$ S $Cm^{-1}$.

The obvious drawback of these systems is their poor mechanical properties, and as is evident from the last example, their mechanical properties can only be improved at the expense of conductivity decreases by increasing the polymer/solvent ratio. Another problem with electrolytes based on PMMA/PC/lithium salt, is that the solvent PC, because of its high vapor pressure, easily corrodes the lithium metal anode in an electrochemical cell. However, high molecular weight atactic PMMA does not form gels with more stable solvents such as EC, DMC, DEC, or their mixtures.

To overcome the shortcomings of existing PMMA gel electrolytes, an alternative gel electrolyte is provided.

It has been known for a long time that isotactic and syndiotactic PMMA can form stereocomplexes in solutions and in bulk. W. Borchard, M. Pyrlik and G. Rehage "Association Phenomena of PMMA in Solutions and Gels," Die Makromelukulare Chemie 145, (1971) 169–188. The stereoassociation between i-PMMA and s-PMMA has been studied in a number of complexing solvents, such as toluene, DMF, THF, acetone, benzene, etc. A drastic (approximately 25 times) increase in viscosity and a weak gel formation was observed in dilute polymer solutions (about several weight percent) when the ratio of isotactic to syndiotactic fractions in the mixture was 1 to 1.

The mechanical properties of PMMA gels were thought to be capable of enhancement by stereocomplexation and chain entanglement between i-PMMA and s-PMMA. Although s-PMMA is not commercially available, it is known that commercial atactic PMMA does not contain a really random distribution of isotactic and syndiotactic dyads, but rather contains long regions of syndiotactic sequences. Therefore, it seemed reasonable to test experimentally whether (i) the stereo association between i-PMMA and syndiotactic sequences of a-PMMA will occur in solutions of lithium salts in propylene carbonate and other alkaline carbonates employed as solvents for lithium salt electrolytes; (ii) these stereo complexes pervade the whole system like crosslinks, forming three dimensional networks and providing additional rigidity.

The gel electrolytes of the invention do not suffer from the problems of the prior art and provide many positive advantages.

SUMMARY OF THE INVENTION

A thermally reversible rubber-like conducting gel electrolyte is provided which includes a blend of atactic or syndiotactic and isotactic poly(methyl methacrylate) (PMMA) and a metal salt in an organic solvent. Preferred components are atactic PMMA (a-PMMA) of a high molecular weight (ca. 1,000,000) and isotactic PMMA (i-PMMA) of a molecular weight higher than 300,000. Preferred solvents are ethylene carbonate (EC), propylene carbonate (PC), dimethyl carbonate (DMC) and diethyl carbonate (DEC). Preferred metal salts are lithium salts LiX(X=$ClO_4$, $CF_3SO_3$, $PF_6$, $N(CF_3SO_3)_2$, $BF_4$). The gel may also include crosslinked PMMA beads or fumed silica for improved strength and thermal stability.

The gel electrolytes disclosed herein have a polymer/solvent mass ratio less than 2/5, room-temperature conductivity higher than $10^{-3}$ S $cm^{-1}$, and elastic moduli in the range of $10^5$ Pa. They may form transparent self supporting, dimensionally stable films, which are noncorrosive and not subject to leakage.

It is an object of the invention to provide a transparent elastic film electrolyte in an extremely thin coating of less than 0.2 mm on a substrate, or as a free standing film.

It is an object of the invention to provide thin film gel electrolytes of the invention that can be made by casting from the melt, or solvent.

It is an object of the invention is to provide a gel electrolyte which while retaining a high conductivity typical to PMMA based gel electrolytes also possesses high elastic moduli.

It is an object of the invention to improve the processing of gel electrolytes into electrolyte separators of electrochemical cells due to the low melting temperature of the stereocomplexed PMMA gels.

Other objects and advantageous feature of the invention will be apparent from the description and claims.

DESCRIPTION OF THE DRAWINGS

The nature and characteristic features of the invention will be more readily understood from the following description taken in connection with the accompanying drawings forming part hereof in which.

Figure 1:
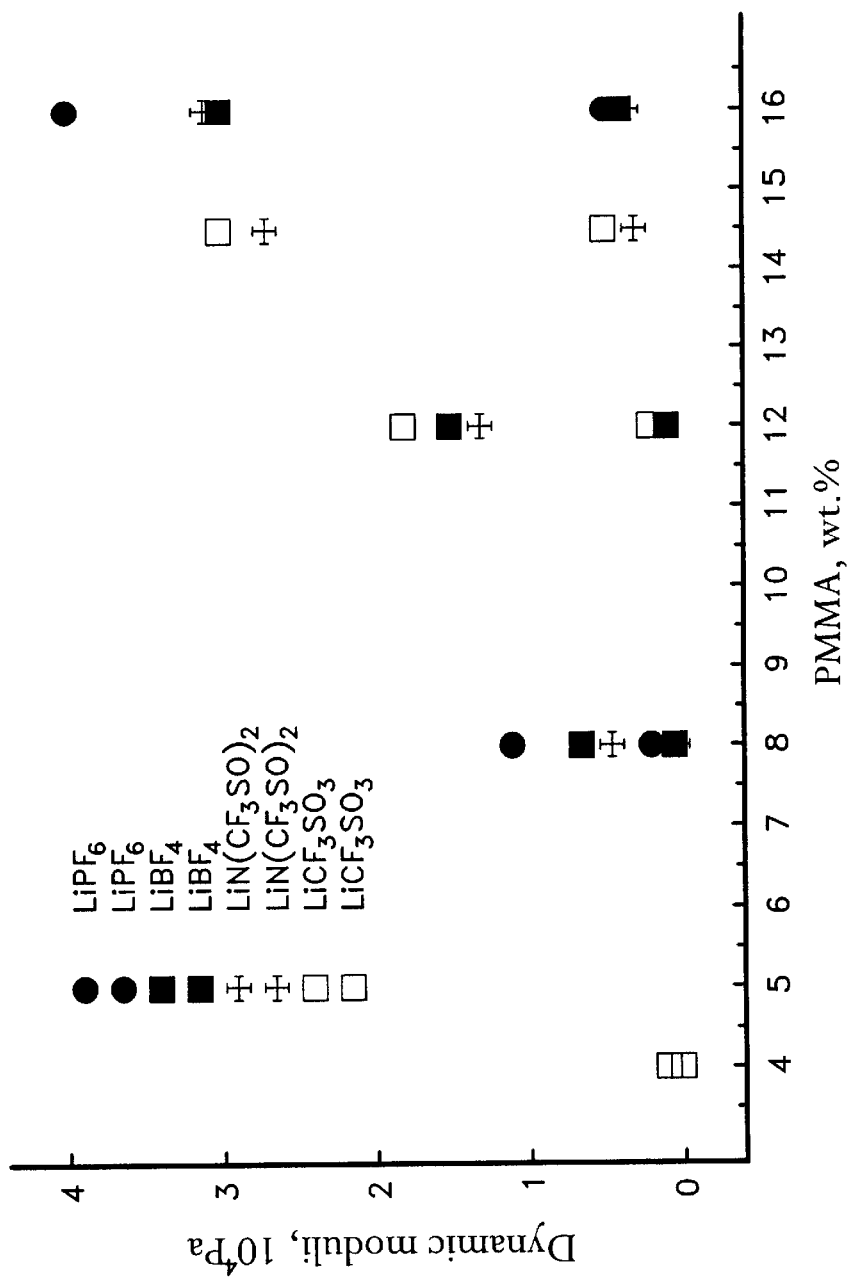
FIG. 1 is a graph illustrating the effects of different salts on the gel compression moduli of the electrolytes of the invention.
Figure 2:
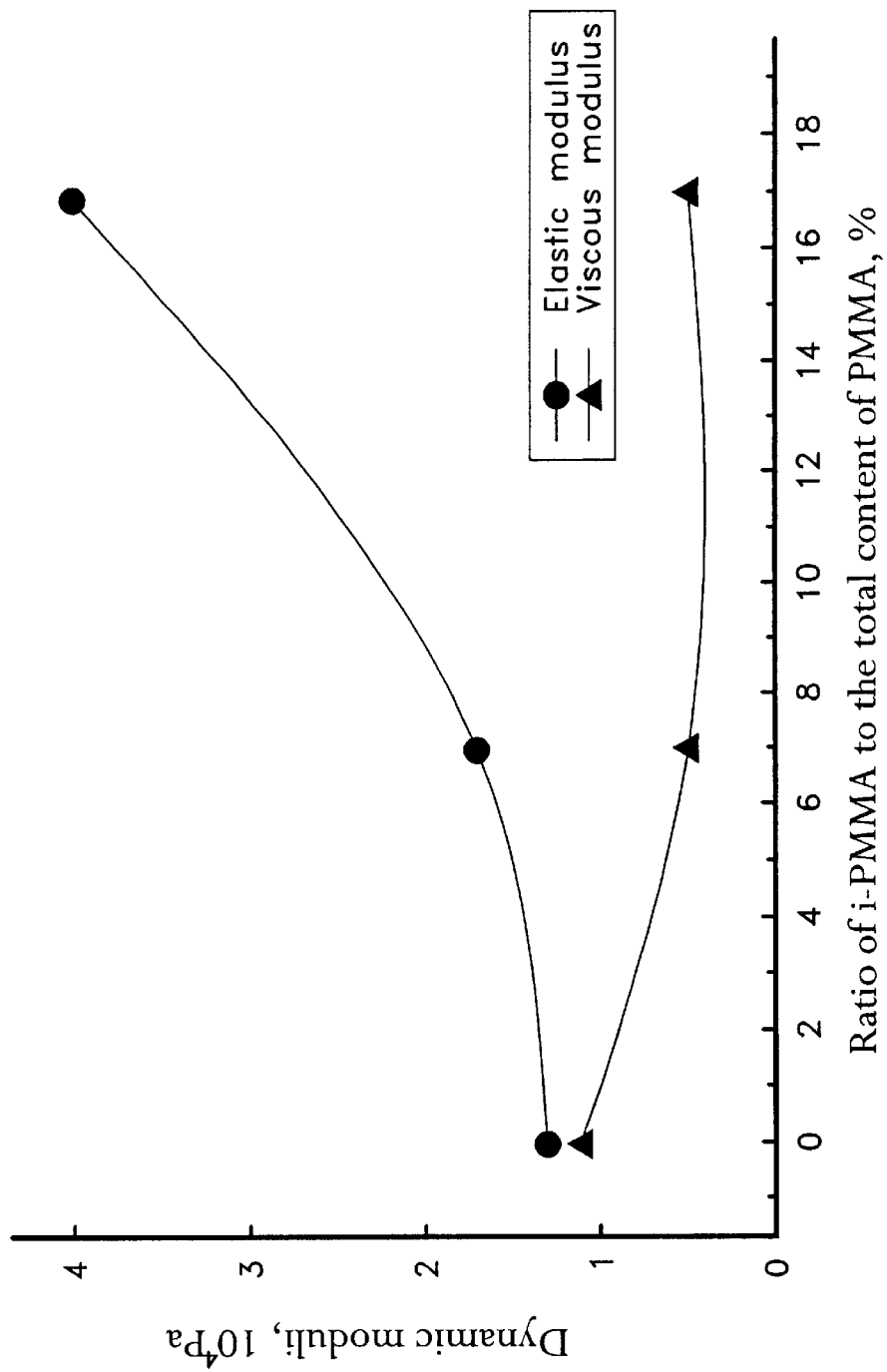
FIG. 2 is a graph illustrating the effect of varying the percentage of isotactic PMMA on the gel compression moduli of the electrolytes of the invention.
Figure 3:
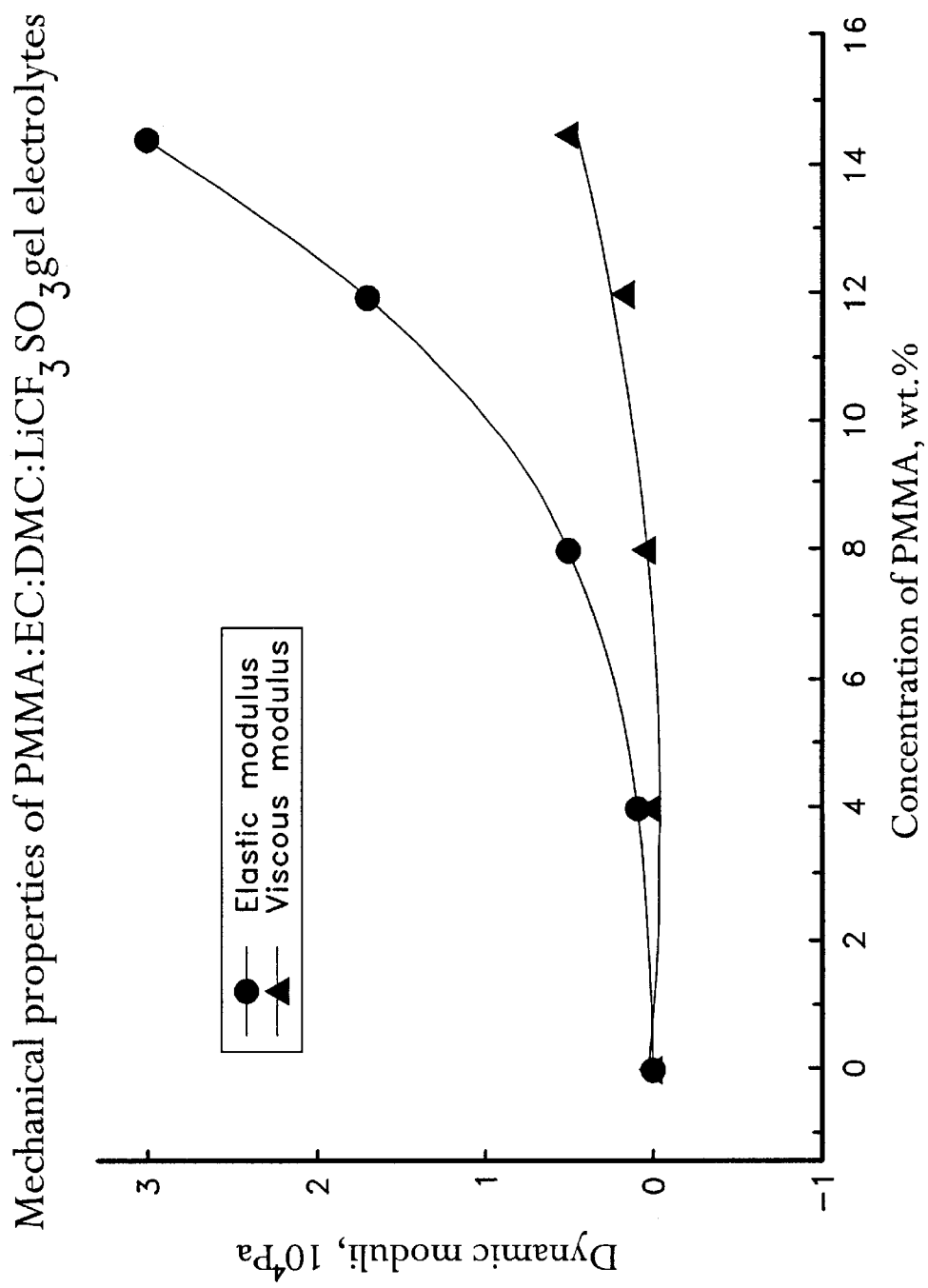
FIG. 3 is a graph illustrating the effects of varying the percentage of PMMA on the gel compression moduli of the electrolytes of the invention.

It should, of course, be understood that the description and drawings herein are merely illustrative, and that various modifications and changes can be made in the disclosed embodiments without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

The invention provides ionically conductive gel electrolytes that combine high ionic conductivities at ambient temperature with good mechanical properties and stability for lithium metal and lithium ion cells.

The invention is based on the concept that mechanical properties of PMMA gels can be enhanced by stereocomplexation and chain entanglement between i-PMMA and syndiotactic PMMA (s-PMMA), or syndiotactic sequences of the atactic PMMA (a-PMMA) chain.

In accordance with the invention, stereocomplexed PMMA gel electrolytes are formed by dissolving a mixture of commercially available polymers—a-PMMA, and i-PMMA and a metal salt in a suitable solvent at a temperature above the gelation point, and then cooling the solution to form the gel. The mechanism of gel formation includes a stereocomplexation between chains of i-PMMA and s-PMMA sequences present in chains of a-PMMA. The stoichiometry of stereocomplexes is 2 syndiotactic to 1 isotactic repeating unit ratio, and the overall structure is a double helix with the syndiotactic chain wrapped around the isotactic one. The network of stereocomplexes brings about enhanced mechanical strength and elasticity of gels at low polymer concentration.

Preferred metal salts are the lithium salts $LiClO_4$, $LiCF_3SO_3$, $LiPF_6$, $LiN(CF_3SO)_2$, $LiBF_4$, and $LiAsF_6$. Other salts will be readily evident to one skilled in the art. The concentration of salt base in the organic compound is selected so as to ensure the maximum conductivity of the gel, and is limited at the upper end of the range by saturation solubility. The concentration of the salt may be about 0.01 to 2 M, preferable about 0.5 to 1.0 M. A variety of organic solvents may be used in formation of the gel as desired. Any solvent which forms a stable gel with stereocomplexed PMMA and which dissolves a lithium salt may be used. A representative but not exhaustive list of suitable solvents is ethylene carbonate (EC), propylene carbonate (PC), dimethyl carbonate (DMC), diethyl carbonate (DEC), dimethyl formamide (DMF), tetrahydrofuran (THF), and mixtures of such solvents.

In another embodiment of the invention a solution of a-PMMA, i-PMMA and a plasticizer in a non-complexing solvent is cast to form a quasi-solid free standing preelectrolyte film after the evaporation of the non-complexing solvent. The film is then soaked in a liquid electrolyte, comprising a metal salt and an organic solvent, to form a thin film gel electrolyte. Preferred plasticizers may be chosen from the same group of suitable polar organic solvents listed above, e.i. EC, PC, DMC or a mixture thereof. Preferred non-complexing solvents are those that do not complex with PMMA, for example, chloroform, dichloromethane, etc.

Stereocomplexed PMMA gel electrolytes formed in accordance with the invention show excellent mechanical properties and high ionic conductivities, comparable to the conductivities of liquid lithium salt/solvent electrolytes ($1\times10^{-3}$–$5\times10^{-3} Scm^{-1}$ at room temperature, depending on the solvent/salt combination). The high conductivity may be attributed to a low PMMA content of the gel, normally between 8 to 20% by weight. Even at these low polymer concentrations, free standing films with excellent mechanical properties and adhesive strength can be formed. Mechanical properties of thin film electrolytes are as important as the conductivity properties, because film electrolytes should separate the anode and the cathode in electrochemical cells and they can also be used as binders for the electrodes. A unique feature of the invention is that the self-supporting film electrolytes can be formed when the total content of PMMA (atactic plus isotactic) is as low as 8% by weight.

For some applications, an addition of fumed silica may further improve mechanical properties of the gel without negatively affecting the conductivity.

One of the novel properties of the stereocomplexed gel electrolytes of the invention is that they may be formed with solvents that do not normally form gels with high molecular weight a-PMMA; namely, DMC, DEC, EC and their mixtures. These solvents, especially DMC and DEC, are known to enhance the conductivity of gels as compared with PC, and they are also more stable.

Another novel property of the stereocomplexed gel is that it is thermoreversible with a melting point ~80° C. This allows processing of an electrolyte into a thin uniform film from the melt and does not require a casting solvent.

Figure 4:
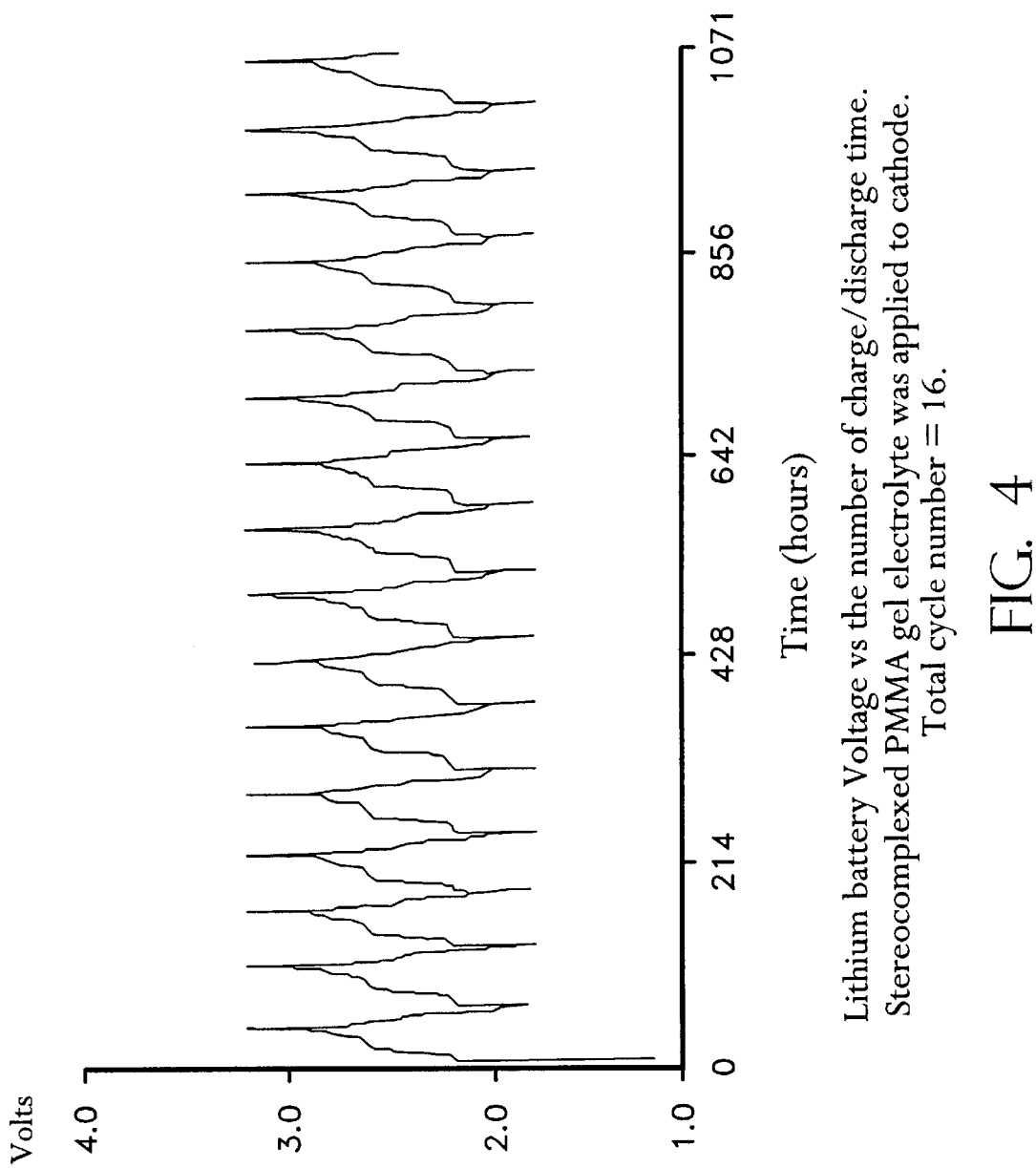
FIG. 4 is a graph illustrating lithium metal battery voltage versus the discharge time for one embodiment of the invention.
Figure 5:
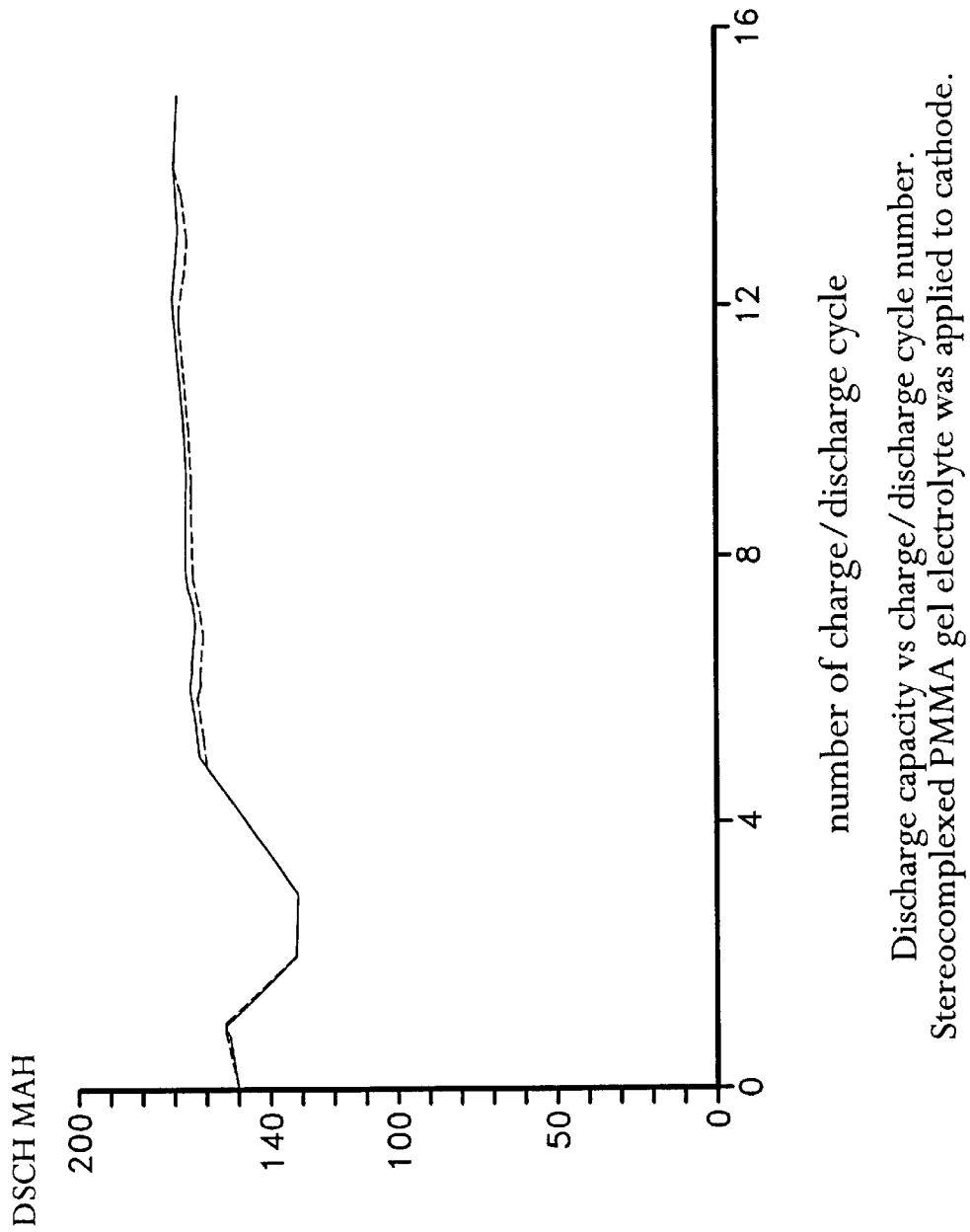
FIG. 5 is a graph illustrating the discharge capacity versus the number of charge/discharge cycles for an embodiment of the invention.

Electrochemical studies and tests of an electrochromic cell and a lithium battery cell as illustrated in FIGS. 4 and 5 show that stereocomplexed PMMA gels exhibit high electrochemical stability and charge-discharge cyclability. Thus the conducting gels disclosed herein are noncorrosive, self supporting, dimensionally stable and not subject to leakage. These properties make the disclosed materials very favorable candidates for electrolytes in large area electrochromic devices, high energy density rechargeable lithium batteries, and redox supercapacitors.

Gel Preparation Procedure

All solvents, lithium salts and polymers were dried prior to usage. All preparations were performed in a dry glove box under the flow of dry argon. The procedure of gel electrolyte preparation was as follows.

Dry lithium salt was dissolved in the anhydrous solvent using the molar proportion required to obtain maximum conductivity (usually 1M). A measured volume of the solution was added to a measured weight of i-PMMA in a dry sealed vessel, and heated to 85° C. under mechanical stirring until the polymer was completely dissolved. A measured weight of a-PMMA was added to the solution and dissolved under continuous stirring at the same temperature. The vessel was cooled to room temperature. Upon cooling the solution ceased to flow and solidified to a gel.

TEST METHODS

Measurements of DC Ionic Conductivity. DC conductivity measurements were performed on a YSI MODEL 35 Conductance Meter. A preheated measuring cell 3403 Cell (YSI Co.) was filled with the melted gel electrolyte and then allowed to cool to room temperature. The DC conductivity of gel electrolytes was also measured as a function of temperature using an oil bath.

Measurements of AC Ionic Conductivity. Gel electrolytes were melted and cast into discs of diameter 9.5 mm and thickness ~1–2 mm. These discs were placed between parallel circular disc stainless steel electrodes. The contact area and electrolyte thickness was accurately known. A RCL Precision Digibridge was used to measure the complex admittance of the cell in the frequency range 10 Hz to 100 kHz. Due to the blocking nature of the electrodes, the real part of the admittance rose with frequency to a plateau. The bulk gel electrolyte conductivity was calculated from the real part of the frequency-independent plateau observed in the real part of the admittance at frequencies above 10–20 kHz.

Measurements of Gel Compression Moduli. Gel samples were reheated until they flowed and then a 2 g aliquot was transferred into a 5 ml cylinder-shaped vial with a flat bottom followed by cooling to room temperature. After the gel was re-formed it was removed from the vial by centrifugation. The samples had a shape of a cylinder with 6.5 mm diameter and ~10 mm height. These gel cylinders were placed between parallel circular disc platens of 15 mm diameter (parallel plate fixture) in a Rheometrics Solid Analyzer RSA II from frequency sweep and temperature step test modes.

Measurements of Gel Tension Moduli of Thin Film Gel Electrolytes. A solution of a-PMMA, i-PMMA and DEC in chloroform (polymer content ~15–20 wt. %) was cast to form a quasi-solid film after the evaporation of chloroform and a larger portion of DEC. Rectangulars of the size 12×30 mm were then cut out from the film and soaked in a liquid electrolyte consisting of 1M solution of a lithium salt in an appropriate solvent (i.e. EC, DEC, DMC or a mixture thereof). After soaking for approximately 0.5–2.0 hr, the rectangular shaped gel films were taken for tension moduli measurements using a Rheometric Solid Analyzer RSA II.

EXAMPLE 1

0.34 g of i-PMMA (MW 300,000) were dissolved in 8.0 g of 1M solution of $LiClO_4$ in PC. Then 1.66 g of a-PMMA (MW 996,000) was added and dissolved at 85° C. After cooling to room temperature an ionically conductive elastic gel was formed. The results of the tests were as follows. Conductivity at 20° C., $1.28 \times 10^{-3}$ S cm$^{-1}$; storage and loss compression moduli (at test frequency 1 H$_z$) $0.41 \times 10^5$ Pa; and $0.05 \times 10^5$ Pa respectively; melting point 75° C.

EXAMPLES 2–7

Examples 2–7 were formulated in a manner similar to Example 1, but the ratio of i-PMMA to a-PMMA total polymer concentration was varied, and the nature of the solvents and lithium salts was also varied with the results presented in Table 1.

Example 3, where only atactic PMMA was used, is given for comparison. It clearly demonstrates that a stereocomplexed PMMA gel electrolyte possesses superior elastic mechanical properties at the same total concentration of polymer.

EXAMPLE 8

0.25 g of i-PMMA (MW 300,000), 1.0 g of a-PMMA (MW 996,000), 4.0 g of DEC were dissolved in 4.0 g of chloroform at room temperature and the solution was cast to form a film. After evaporation of chloroform the film was soaked in a 1 M solution of lithium hexafluorophosphate $LiPF_4$ in EC/DMC/DEC (4:5:1) for 45 min at room temperature. The conductivity of the film at 20° C. is $2.1 \times 10^{-3}$ S cm$^{-1}$; the tension elastic modulus is $20.0 \times 10^5$ Pa; the tension loss modulus is $5.1 \times 10^5$ Pa.

Example 9 was formulated in a manner similar to Example 8. Results of the tests for different ratios of isotactic to atactic PMMA, lithium salts, and solvents are provided in Table 1.

TABLE 1

| Ex. | Ratio i-PMMA/ a-PMMA | Polymer concentr wt. % | Solvent | Salt (1M solution) | Conductivity, mS/cm | Storage modulus, $10^5$ Pa | Loss modulus, $10^5$ Pa |
|---|---|---|---|---|---|---|---|
| 1 | 0.20 | 20 | PC | $LiClO_4$ | 1.28 | 0.41 | 0.05 |
| 2 | 0.07 | 20 | PC | $LiClO_4$ | 1.26 | 0.16 | 0.05 |
| 3 | 0 | 20 | PC | $LiClO_4$ | 1.22 | 0.12 | 0.11 |
| 4 | 0.20 | 16 | EC:DMC (45:55) | $LiCF_3SO_3$ | 0.91 | 0.32 | 0.05 |
| 5 | 0.25 | 16 | EC:DMC:DEC (40:50:10) | $LiPF_6$ | 3.80 | 0.42 | 0.04 |
| 6 | 0.20 | 16 | EC:DMC (45:55) | $LiBF_4$ | 1.75 | 0.32 | 0.04 |
| 7 | 0.25 | 32 | EC:DMC:DEC (40:50:10) | $LiPF_6$ | 0.90 | 5.00 | 0.80 |
| 8 | 0.25 | 20 | EC:DMC:DEC (40:50:10) | $LiPF_6$ | 2.10 | 20.0[b] | 5.1[b] |
| 9 | 0.20 | 20 | EC:DMC (45:55) | $LiBF_4$ | 1.40 | 11.4[b] | 4.5[b] |

[a]test frequency 1 Hz;
[b]tension modulus of the film

Sample devices were constructed which utilized the gel electrolytes of the invention as follows:

Electrochromic Window

An electrochromic display device employing Prussian blue and tungsten (VI) oxide $WO_3$ particulate films with a PMMA based gel electrolyte formed according to the invention was constructed.

The electrodes of the device were fabricated as follows.

(I) Prussian blue film was electrochemically deposited at a current density of 5 $\mu$A cm$^{-2}$ from an equivolume mixture of iron chloride $FeCL_3$ and potassium ferricyanide (III) $K_3[Fe(CN)_6]$ aqueous solutions on the glass electrode with an indium tin oxide (ITO) conducting layer.

(II) A tungsten (VI) oxide $WO_3$ particulates film was formed on an ITO coated glass electrode by dipping it in the colloidal suspension of $WO_3$ and pulling the electrode up at a constant speed. The colloidal suspension was prepared by adding ammonia water to acidic (HCl) aqueous solution of sodium tungstate dihydrate $Na_2WO_4$ under constant stirring for 12 h. The dip coated electrode was heat cured at 300° C. for 3 h.

A PMMA gel electrolyte, comprising PMMA, EC, PC, (20:40:40, i-PMMA/a-PMMA=0.25) and $LiClO_4$ (5 wt. %) was melt cast on the first electrode and after cooling to room temperature was covered with the second electrode. The electrodes were sealed with epoxy resin. A reversible color change between blue and colorless was observed when a square wave potential of –0.5 and 1.0V was applied alternatively to the electrochromic device. The rates of coloring and bleaching were 50 and 25s respectively.

Li-ion Rechargeable Cell

A rechargeable lithium intercalated cell comprising a lithium cobalt dioxide positive electrode, a carbon negative electrode, and a stereocomplexed PMMA electrolyte layer was constructed and tested.

The preparation of a prototype battery using stereocomplexed PMMA gel electrolyte as a separator was as follows.

1. Preparation of Cathode Solution. The solution was made by mixing poly(vinylidene fluoride), DEC, conductive carbon black and $LiCoO_2$ in the weight ration of 4:6:4:15 and dissolving the mixture in 75 parts of acetone.

2. Preparation of Anode Solution. The solution was made by mixing poly(vinylidene fluoride), DEC, conductive carbon black and carbon meso-beads (MCMB) in the weight ratio of 4:6:4:13 and dissolving the mixture in 75 parts of acetone.

3. Preparation of Cathode and Anode Films. Anode or cathode films were prepared by dip coating a carbon fiber non woven web into the anode or cathode solution.

4. Preparation of Electrodes. The cathode was formed by laminating an aluminum grid (with an aluminum lead at one end) with the cathode film at 120° C. and 30 psi by using a hot laminator. The anode was formed by laminating a copper grid (with a copper lead at one end) with the anode film at 120° C. and 30 psi by using a hot laminator.

5. Preparation of the Separator. i-PMMA, a-PMMA and DEC were mixed in a weight ratio of 1:5.5:5.5, and then dissolved in 40 parts of chloroform. The solution was Doctor bladed onto a polyester support film. After evaporation of the chloroform, a separator film of ~100 μm thickness was obtained.

6. Preparation of the Electrochemical Cell. The separator was sandwiched between the anode and the cathode, and laminated at 120° C. and 30 psi by using a hot laminator.

7. Activation of the Cell. The sandwiched cell was activated in a 1M solution of $LiPF_6$ in a mixture of EC, DMC, and DEC (45:45:10). The activation was performed for 45 minutes at room temperature in a glove box, which was purged with argon. The cell was dried, wrapped in aluminum/polyester double laminated foil and hot sealed.

Lithium-Metal Rechargeable Cell

A rechargeable lithium metal cell comprising a cobalt dioxide positive electrode, a lithium metal negative electrode, and a stereocomplexed PMMA electrolyte layer has been constructed and tested.

The preparation of a prototype battery using stereocomplexed PMMA gel electrolyte as a separator was as follows.

1. Preparation of the Cathode Film. A carbon fiber non woven web was dip coated with a solution comprising 25 parts of a mixture of PMMA, DEC, conductive carbon black and $CoO_2$ (in the weight ratio of 4:6:4:15) and 75 parts of acetone.

2. Preparation of the Cathode. The cathode was formed by laminating an aluminum grid (with an aluminum lead at one end) with the cathode film at 50° C. by using a hot laminator.

3. Preparation of the Separator. A conductive gel according to Example 5 was melted and cast on a non woven web. After cooling a conductive film of ~125 μm thickness was formed.

4. Preparation of the Electrochemical Cell. The separator was sandwiched between the lithium anode and the cathode and laminated at 50° C. by using a laminator. The cell was dried, wrapped in aluminum/polyester double laminated foil and hot sealed.

It will thus be apparent that ionically conductive gel electrolytes have been provided with which the objects of the invention are achieved.

We claim:

1. An ionically conductive thermoreversible gel electrolyte comprising (i) a blend of
   (a) at least one of atactic poly(methyl methacrylate) or syndiotactic poly(methyl methacrylate); and
   (b) isotactic poly(methyl methacrylate);
(ii) a complexing organic solvent; and
(iii) a salt soluble in said organic solvent.

2. The gel electrolyte according to claim 1, wherein said solvent is selected from the group consisting of ethylene carbonate, dimethyl carbonate, diethyl carbonate, N-methy-2-pyrrolidinine, propylene carbonate, and butylene carbonate.

3. The gel electrolyte of claim 1, wherein said salt is a lithium salt containing an anion selected from the group consisting of perchlorate, trifluoromethylsulfonate, tetrafluoroborate, hexafluorophosphate, and bis(trifluoromethylsulfonyl)imide.

4. The gel electrolyte of claim 1, wherein the ratio of isotactic to syndiotatic fractions of said poly(methyl methacrylate) is between 0.05 and 0.3.

5. A method of making an ionically conductive thermoreversible gel electrolyte comprising the steps of:

forming a solution of a mixture of atactic and isotactic poly(methyl methacrylate) in an organic solvent at above 20° C.;

incorporating a lithium salt beforehand, simultaneously or afterwards; and cooling the solution.

6. A method of making an ionically conductive thermoreversible gel electrolyte comprising the steps of:

forming a solution of a mixture of atactic or syndiotactic poly(methyl methacrylate), isotactic poly(methyl methacrylate), and an organic solvent selected from the group consisting of ethylene carbonate, dimethyl carbonate, diethyl carbonate, N-methyl-2-pyrrolidinine, propylene carbonate, and butylene carbonate in a non-complexing solvent; and soaking said film in a solution of a salt and said organic solvent.

7. A method of making a gel electrolyte film according to claim 6, wherein the non-complexing solvent is chloroform or dichloromethane.

8. A gel electrolyte as defined in claims 1 or 2 or 3 which additionally contains cross linked poly(methyl methacrylate) beads or fumed silica.

9. An electrochemical cell having an anode, a cathode, and an electrolyte wherein said electrolyte comprises a gel made by the method of claim 5.

10. An electrochemical cell having an anode, a cathode, and an electrolyte wherein said electrolyte comprises a gel made by the method of claim 6.

11. An electrochemical cell having an anode, a cathode, and an electrolyte wherein said electrolyte comprises a gel according to claim 1.

12. An electrochemical cell having an anode, a cathode, and an electrolyte according to claim 1 wherein said electrolyte is a binder.

13. A gel electrolyte as defined in claims 7 or 5 or 6 wherein said method comprises the additional step of incorporating cross linked poly(methyl methacrylate) beads or fumed silica.

* * * * *